United States Patent [19]
Helfet et al.

[11] Patent Number: 5,137,617
[45] Date of Patent: Aug. 11, 1992

[54] OPTICAL DISK MANUFACTURE

[75] Inventors: Peter R. Helfet, London; Robert J. Longman, Coton; Jitka Brynjolffssen, Royston, all of United Kingdom

[73] Assignee: Plasmon Data Systems, Inc., San Jose, Calif.

[21] Appl. No.: 391,493

[22] Filed: Aug. 9, 1989

[30] Foreign Application Priority Data

Aug. 9, 1988 [GB] United Kingdom ............... 8818835

[51] Int. Cl.$^5$ ............................................. C25D 1/10
[52] U.S. Cl. ...................................................... 205/68
[58] Field of Search ............................................. 204/5

[56] References Cited

U.S. PATENT DOCUMENTS 4,500,392  2/1985  Slaten ........................... 204/5

Primary Examiner—T. M. Tufariello
Attorney, Agent, or Firm—Poms, Smith, Lande & Rose

[57] ABSTRACT

A method of reducing the surface noise of optical disk products of the type having a surface relief pattern is disclosed. In one embodiment, an adherent layer is applied to the substrate of the disk before it is coated with the recording material layer. In another embodiment, a polymeric replica produced from a master disk is treated by spin coating or dipping in a weak solvent which serves to smooth out microscopic roughness thereby removing surface irregularities. In a third embodiment, a metal coated replica is subjected to an electropolishing operation which again serves to remove a small amount of metal material, preferentially from "high spots".

9 Claims, 1 Drawing Sheet

OPTICAL DISK MANUFACTURE

This invention relates to a method of reducing surface noise during optical disk manufacture.

Conventional processing of optical disks uses etching of photoresist to produce a surface relief pattern containing grooves for track guidance and coded address information to enable the drive to locate areas for recording and reading of data. Conventionally the resist is electroplated to produce a nickel master from which replicas are produced by injection molding or casting. Subsequently a recording layer is deposited on the surface by a process such as spinning or vacuum deposition. During this processing—especially during developing of the photoresist—the surface may become roughened and the surface noise of the finished product may be increased.

It is an object of this invention to reduce the surface noise of the final product by means of processing at an intermediate stage of manufacture.

According to the present invention there is provided a method of reducing surface noise in an optical disk of the type having a surface relief pattern, which method comprises applying an adherent layer to the substrate of the disk before it is coated with material to form the recording layer.

According to another aspect of the present invention there is provided a method of reducing surface noise in an optical disk of the type having a surface relief pattern, which method comprises applying a mild solvent to a polymer replica made from a master disc.

According to a third aspect of the present invention, there is provided a method of reducing surface noise in an optical disk of the type having a surface relief pattern, which method comprises electropolishing an intermediate electroform prior to its use for replication of an optical disk.

The invention will now be illustrated further with reference to the accompanying drawings, in which.

Reference will be made to the drawings in the Examples which follow.

EXAMPLE 1

Treatment of Nickel Stampers

Figure 1:
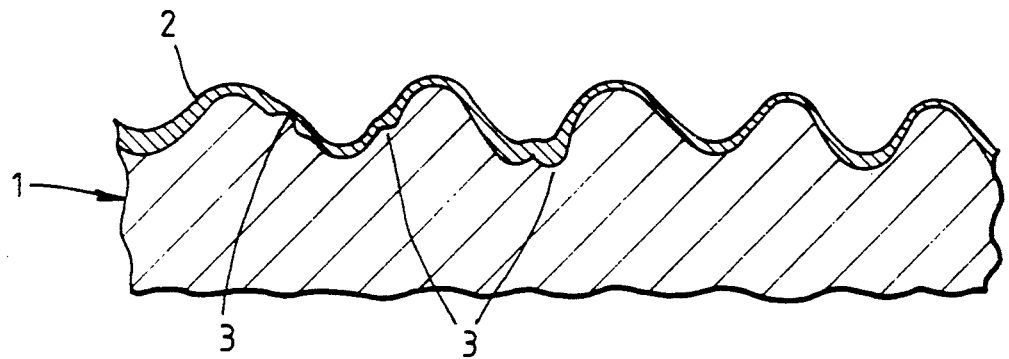
FIG. 1 is a schematic view, in cross-section and highly magnified, of an optical disk surface treated by a method of this invention.

An intermediate nickel copy 1 (see FIG. 1) is produced from a master disk. A thin smoothing layer 2 is then applied to the surface by spin coating or dipping using either (a) polymethyl methacrylate (PMMA) in a suitable solvent solution with good wetting properties, or (b) a diluted photoresist, or (c) a diluted electron beam resist. For (b) and (c), spinning at about 800 rpm for about 5 minutes is preferred. If desired, the surface being treated may be covered by a contoured top plate in order to improve uniformity. As a result of this operation, the layer 2 obliterates most of the irregularities 3 in the nickel surface. After coating, the surface is metallised to make it conducting and a copy is make by electroforming (not shown). This copy or a further generation copy is used for replication. It has been found that the smoothing process applied in this way can reduce surface noise by as much as 6 dB.

EXAMPLE 2

Treatment of Replicas

Figure 2:
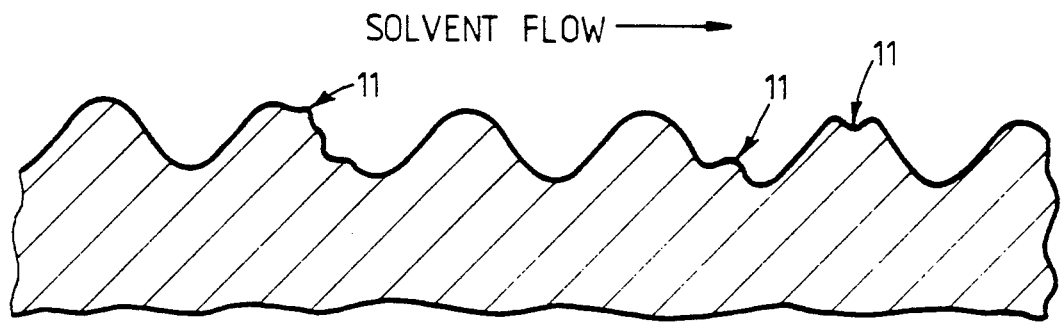
FIG. 2 is a schematic illustration of the surface of another optical disk before treatment in accordance with this invention.
Figure 3:
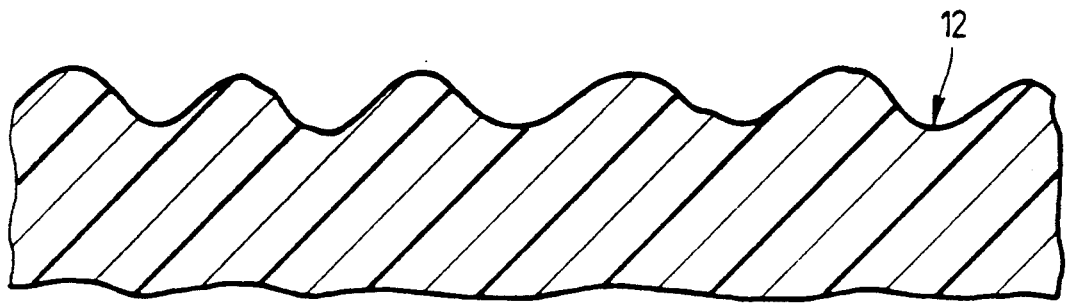
FIG. 3 shows the surface depicted in FIG. 2 after treatment by a method of this invention.

A polymer replica 10 (see FIG. 2) made from a master disk (not shown) was treated by spin coating or dipping in a weak solvent or solvent mixture. This solvent mixture removes and redeposits a small amount of material on the surface. The wetting properties of the solvent means that the roughness of the substrate are reduced; after spin washing with solvent, the "high spots" are preferentially removed and during the subsequent drying, material is redeposited in "low spots". FIG. 3 shows the resultant improved surface 12. After coating it has been found that surface noise was reduced by as much as 5 dB by this means. The overall depth of the relief pattern is reduced by this treatment. Surface tension forces during drying cause microscopic roughness to be preferentially smoothed. If desired, the initial aspect ratio of the relief pattern can be modified to allow for this reduction in surface relief depth.

EXAMPLE 3

Stamper Polishing

The intermediate electroform used in Example 1 was subjected to an electropolishing operation to remove a small amount of metal from the front surface. This electroform may either be used directly for replication or a copy may be made and the copy used for replication. By proper control of the electropolishing solution it is possible selectively to remove roughness from the surface without destroying the desirable features. In all three Examples the depth of the desirable features is reduced. In order to compensate for this the master disk may be produced with a larger surface relief than would conventionally be required.

Clearly the same technique could be applied at other points in the process such as spinning of solvents or deposition of a smoothing layer on the photoresist directly, and such modifications fall within the scope of this invention.

We claim:

1. A method of making optical data storage disks, which comprises the steps of: (1) applying a photoresist to a substrate; (2) exposing and developing the photoresist to generate a predetermined surface relief profile therein, said surface relief profile having a predetermined depth; (3) electroplating the developed photoresist to generate an intermediate electroform; (4) making a replica from said intermediate electroform by engaging said electroform by material which assumes a configuration matching that of said intermediate electroform, said material forming a portion of said replica; and (5) depositing a recording layer on the surface of said replica; wherein the method comprises the additional step of coating at least one of said developed photoresist, said intermediate electroform, and said replica with a non-metallic layer to improve the smoothness of the surface onto which the recording layer is deposited.

2. A method according to claim 1, wherein said additional step comprises applying said layer to said intermediate electroform.

3. A method according to claim 1, wherein said replica is a polymer replica and including the additional step of applying a mild solvent to the surface of said polymer replica.

4. A method according to claim 1, including the additional step of electropolishing said intermediate electroform.

5. A method of making optical data storage disks, which comprises the steps of:
(a) applying a photoresist to a substrate;
(b) exposing and developing the photoresist to generate a predetermined surface relief profile therein, said surface relief profile having a predetermined depth;
(c) electroplating the developed photoresist to generate an intermediate electroform;
(d) making a polymer replica from said intermediate electroform by engaging said electroform by material which assumes a configuration matching that of said intermediate electroform, said material forming a portion of said replica; and
(e) depositing a recording layer on the surface of said replica;
(f) applying an adherent coating of a non-metallic material to said intermediate electroform;
(g) applying a milk solvent to the surface of said polymer replica; and
(h) electropolishing said intermediate electroform.

6. A method of making optical data storage disks, which comprises the steps of:
(a) applying a photoresist to a substrate;
(b) exposing and developing the photoresist to generate a predetermined surface relief profile therein, said surface relief profile having a predetermined depth, and having microscopic roughness in the surface relief profile;
(c) electroplating the developed photoresist to generate an intermediate electroform;
(d) making a replica from said intermediate electroform by injection molding, stamping, or casting;
(e) smoothing the microscopic roughness of at least one of said developed photoresist, said intermediate electroform and said replica by coating a non-metallic layer on the surface thereof;
(f) depositing a recording layer on the surface of said replica, which recording layer is free of said microscopic roughness;
whereby the surface noise of said optical disk is significantly reduced.

7. A method of making optical data storage disks, which comprises the steps of:
(a) applying a photoresist to a substrate;
(b) exposing and developing the photoresist to generate a predetermined surface relief profile therein, said surface relief profile having a predetermined depth;
(c) electroplating the developed photoresist to generate an intermediate electroform;
(d) making a replica from said intermediate electroform by a technique selected from the group consisting of injection molding, stamping, and casting; and
(e) depositing a recording layer on the surface of said replica, wherein the method comprises the additional step of treating said intermediate electroform to improve the smoothness of the surface onto which the recording layer is deposited, said intermediate electroform being treated by the application thereto of an adherent layer of a non-metallic material selected from the group consisting of polymethyl methacrylate, photoresist and electron beam resist.

8. A method according to claim 7 wherein said adherent layer is formed of polymethyl methacrylate.

9. A method according to claim 8, wherein said adherent layer is formed of a resist material.

* * * * *